(No Model.)
F. G. WINNEK.
WATER COOLER AND FILTER.
No. 415,598. Patented Nov. 19, 1889.
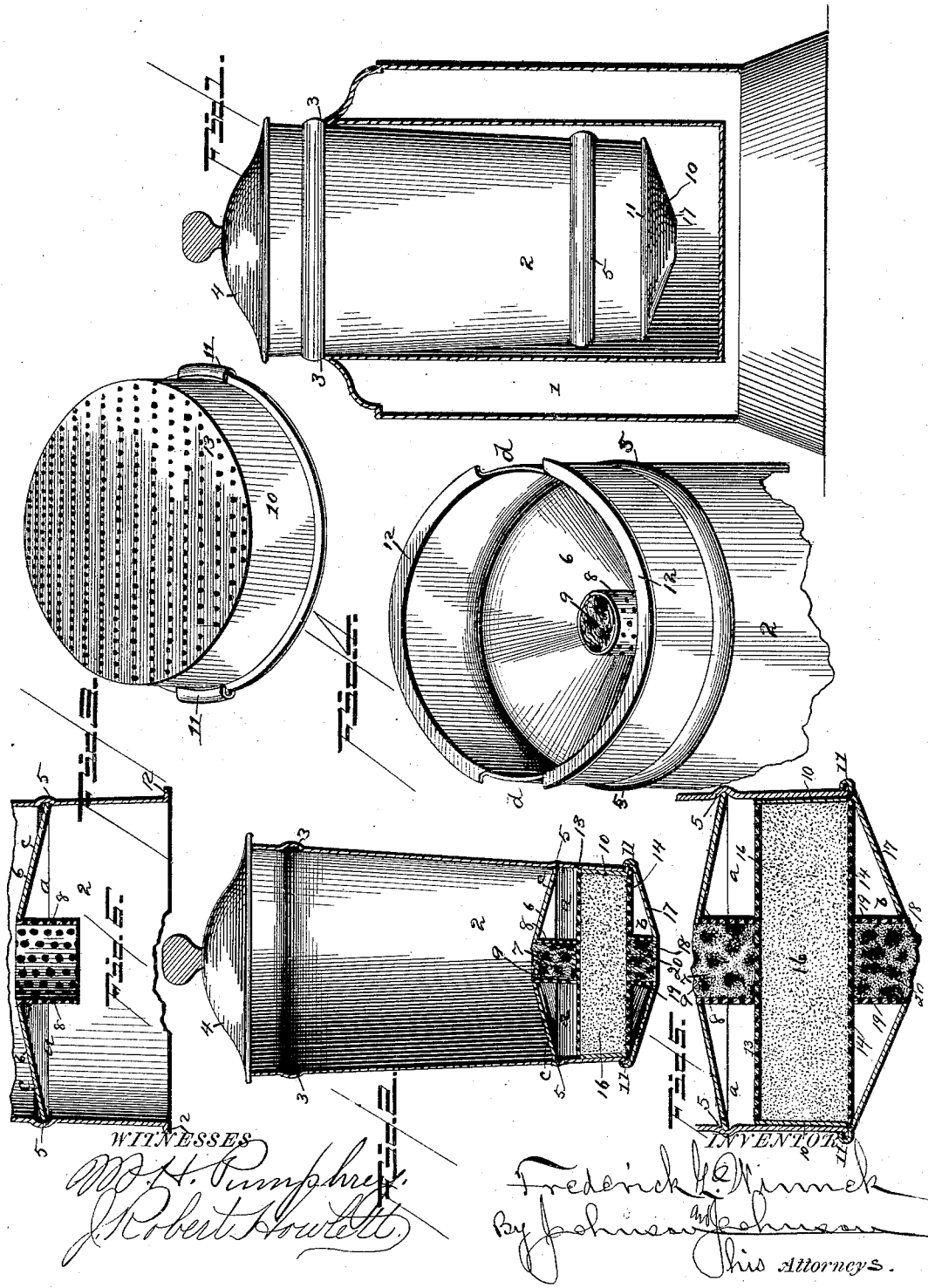

UNITED STATES PATENT OFFICE.

FREDERICK G. WINNEK, OF LEAVENWORTH, KANSAS, ASSIGNOR OF ONE-HALF TO JAMES H. HUNTER, OF SAME PLACE.

WATER COOLER AND FILTER.

SPECIFICATION forming part of Letters Patent No. 415,598, dated November 19, 1889.

Application filed July 30, 1888. Serial No. 281,367. (No model.)

*To all whom it may concern:*

Be it known that I, FREDERICK G. WINNEK, a citizen of the United States, residing at Leavenworth, in the county of Leavenworth and State of Kansas, have invented a new and useful Improvement in a Combined Water Cooler and Filter, of which the following is a specification.

My invention relates to water-filters particularly adapted for water-coolers and for refrigerators; and the objects of my improvements are to provide for more perfect cleanliness and renewal of the filtering device. In this provision the filtering material is supplemented on both sides by a free chamber having a centrally-confined filtering-sponge. The upper chamber has a conical cover with a central opening for access to the sponge, and forms a distributing and cleaning chamber, and the lower chamber has a conical bottom with a central opening for access to the sponge, and forms a collecting-chamber, while the charcoal is confined between perforated plates, which form the inner sides of these free chambers.

When the device is applied to a water-cooler and forms the lower end of the ice-receptacle thereof, the upper conical cover may be fixed in the receptacle and form its bottom and support for the ice. The conical form of this cover or bottom, while it gives a central support for the ice, also forms an annular gutter beneath the ice around the walls of the receptacle for the collection of the dirt and sediment from the ice. The inlet for the water into the top filter distributing-chamber is through the central sponge-filled perforated tube in the conical cover, and the outlet for the filtered water from the lower collecting-chamber is through the central sponge-filled perforated tube in the conical bottom cover. This construction permits of perfectly cleaning the device at any time, and produces a very simple and effective filter, the specific matters of improvement wherein will be pointed out in the claims concluding this specification.

Referring to the accompanying drawings, which illustrate my improved filtering device, Figure 1 represents a vertical section of a water-cooler, showing the ice-receptacle and filter supported therein; Fig. 2, a vertical section of the ice-receptacle and filter; Fig. 3, the filter-containing device; Fig. 4, the lower open end of the ice-receptacle inverted, wherein is seen the central sponge-confining tube of the fixed conical cover of the filtering device; Fig. 5, a vertical section of the filtering device, enlarged; Fig. 6, an enlarged vertical section of the lower end of the ice-receptacle, showing the conical ice-support and its central sponge-confining tube fixed in the lower part of said receptacle.

In the drawings, the numeral 1 indicates an ice-cooler of the usual or any preferred construction, and 2 indicates the receptacle, which is supported within the same, having, preferably, a bead 3 near its upper end, with which it may rest upon the upper edge of the cooler, the lid or cover 4 of said cooler fitting upon the upper end of said receptacle and closing the same.

The receptacle 2 is formed with a bead 5 near the lower end and a conical bottom 6, which, as shown, has its edges secured in said bead. The top or apex of said bottom 6 is formed with a central aperture 7, in which a downwardly-projecting perforated tube 8 is secured and is filled with sponge 9 or a similar straining-filling.

The filter-casing 10, which fits into the lower end of the receptacle 2 below the conical bottom 6, is provided with upwardly and inwardly-bent lips 11 at two or more points of its lower edge, which lips engage a laterally-projecting flange 12 upon the lower edge of the receptacle. This flange is cut away at places *d d*, which register with the lips 11 upon the filter, so as to admit said lips into a position to engage said flange by turning the filter and thus sliding said lips over upon said flange.

The filter 10 is provided with a loose finely-perforated flat top 13, which joins the perforated tube 8, and with a flat perforated bottom 14, and a charcoal filling 16 is packed into the space between these two perforated heads 13 and 14, being preferably sufficiently compressed to form a hard porous mass. A conical bottom 17 is secured below the perforated bottom 14 of the filter 10, and said bottom 17 is formed with a central opening 18, in which a short perforated tube 19 is secured and extends to and joins said bottom or head 14, and has a packing or filling 20 of sponge or similar straining material. This construction forms a free chamber $a$ and $b$ around the perforated tubes 8 and 19 and within the conical covers at the top and at the bottom of the filtering device, wherein the water passing through the sponge and the perforated top tube is distributed upon and over the perforated top plate, and wherein the water passing through the charcoal is collected around the lower perforated tube and passes through it and its confined sponge. These free chambers also permit the cleaning of the perforated plates which confine the charcoal, so that the holes in said plates may be kept open.

The conical cover or bottom 6 forms a central support for the ice and a circumferential gutter $c$ around the walls of the receptacle 2, wherein the dirt and sediment from the ice settles and will be collected, and thus prevent the choking and obstruction of the centrally-confined sponge and its perforated tube.

The water from the receptacle will pass through the centrally-confined sponge 9 and fill the conical top chamber $a$, from which it passes through the charcoal filter into the lower collecting-chamber and out through the centrally-confined sponge 20 into the filtered-water receptacle. The sponge of the top chamber tube collects the sand and dirt from the ice, while the sponge of the lower chamber collects the particles of charcoal which may pass into said lower chamber. The chambers are preferably conical, the upper one for the two purposes stated, and the lower one for directing the outflow around the central tube in the same volume as that which passes from the upper chamber.

The filter may be easily removed and a new one put in its place, while the provision of the central tubes, their sponge-filters, and the top and bottom chambers $a$ and $b$ gives every facility for cleaning the filter, so that the water from the ice when delivered into the cooler proper will be pure.

When the filter is applied to refrigerators, it can be placed in such relation to the ice-box as to catch and filter the water from the melting of the ice, and which can be collected into a chamber or vessel; or it may be attached to the ice-box.

To facilitate the cleaning of the chambers $a$ and $b$ and the removal and renewal of the charcoal or filtering material, the perforated heads 13 and 14 are preferably loosely placed upon and in the filter-casing 10. The perforated heads 13 and 14 may be held in place in the casing, and the upper head 13 may be held against the tube 8 by the fastening at the lower end of the ice-receptacle.

The separate casing for the filtering material has the advantage over a filter-casing forming part of the water or ice receptacle and having a removable bottom or lid, that it may be removed from the ice-receptacle for cleaning or renewal of the filtering material, rendering such processes easier effected and more successful than in the latter construction.

Having thus described the construction and arrangement or combination of parts of my improved water filter and cooler, what I claim as new is—

1. The receptacle 2, having a fixed upwardly-pointing conical partition 6 near its lower end, provided with a central opening 7, in combination with a casing 10, having the perforated heads 13 and 14, the filtering material inclosed thereby and inserted and supported within said receptacle below said partition, and having a downwardly-pointing conical bottom 17, provided with a central opening 18, the said conical parts 6 and 17, forming the chambers $a$ and $b$, supplementing the top and bottom surfaces of the filtering material, as described.

2. The receptacle 2, having a fixed upwardly-pointing conical partition 6 near its lower end, provided with a central opening 7, and a coincident downwardly-projecting perforated tube 8, in combination with a separate filter containing casing 10, inserted and supported within said receptacle below said partition, having a downwardly-pointing conical bottom 17, provided with a central opening 18 and a coincident upwardly-projecting perforated tube 19, the said conical parts 6 and 17, forming the chambers $a$ and $b$, supplementing the top and bottom surfaces of the filter, and the said tubes extending from the top to the bottom of each of said chambers and containing a sponge, as and for the purpose described.

3. The combination, with a water-cooler 1, of a filtering-vessel consisting of the receptacle 2, having a fixed partition 6, and a separate filter, containing casing 10, inserted within the lower partitioned part of the said receptacle 2 and having the perforated heads 13 and 14 confining the filtering material, and a bottom 17, the top chamber $a$, and the bottom chamber $b$, the said top chamber having a central inflow-opening 7, supplemented by the inflow perforated tube 8, and the said bottom chamber having a central outflow-opening 18, supplemented by the perforated tube 19, the said tubes extending through said chambers and containing a sponge, all as shown and described.

In testimony whereof I have hereunto set my hand in the presence of two subscribing witnesses.

FREDERICK G. WINNEK.

Witnesses:
CLESSON S. KINNEY,
L. K. HUNTER.